July 8, 1958  G. M. KERSTEN  2,842,371
WORK HOLDING DEVICE
Filed May 21, 1957
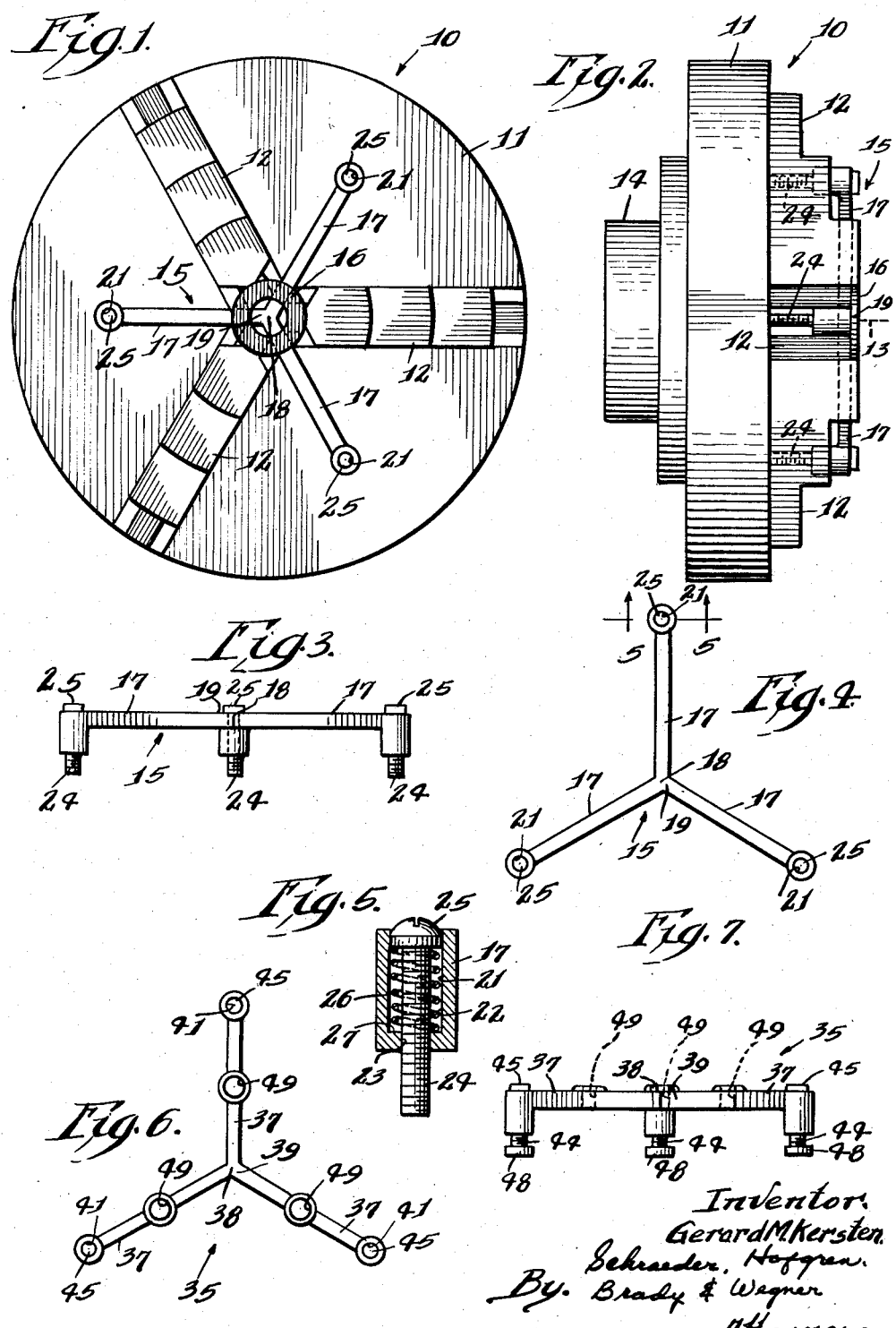

United States Patent Office 2,842,371
Patented July 8, 1958

2,842,371

WORK HOLDING DEVICE

Gerard M. Kersten, Chicago, Ill.

Application May 21, 1957, Serial No. 660,646

8 Claims. (Cl. 279—123)

This invention relates to a work holding device and, more particularly, to a work holding device for relatively thin workpieces to be clamped in a standard multi-jaw chuck.

It is most difficult to properly clamp thin workpieces such as washers in a standard multi-jaw chuck for a machine tool cutting operation. With workpieces having a substantial width, the clamping action of such a chuck automatically centers and aligns such workpieces properly for a cutting operation. But with washers and similar workpieces, a chuck of this type cannot properly center and align such workpieces normal to the axis of the machine tool because of their thinness. Thus, as is often the case, a thin workpiece may be clamped in such a chuck in a plane which is not normal to the axis of the machine tool thereby resulting in a faulty and undesirable machining operation.

In the past, it has been necessary to design and produce custom-made chucks for clamping such workpieces during a machining operation. These custom chucks usually include a tapered shank for mounting the chuck in the head stock of a machine tool and split, spring urged jaws adapted to hold such a workpiece securely in place and properly aligned. Providing these custom-made chucks for each thin workpiece to be machined becomes a relatively expensive proposition.

It is, therefore, the general object of this invention to provide a work holding device which permits such thin workpieces of most sizes to be clamped in a standard multi-jaw chuck in proper alignment for a machining operation.

Another object of this invention is to provide such a work holding device including a member adapted to be positioned against the face plate of the chuck and out of the paths of movement of the jaws of the chuck with said member having a work supporting surface formed thereon and means for adjusting said member to dispose the work supporting surface parallel to the faceplate of the chuck.

A further object of the invention is to provide such a work holding device having micrometer receiving means on the work holding member for facilitating a determination when the work supporting surface is disposed parallel to the faceplate of the chuck and means for holding the work supporting member against the faceplate of the chuck.

Other objects and advantages will become apparent from the following detailed description taken in connection with the accompanying drawings, in which:

Fig. 1 is an end elevational view showing a preferred form of the work holding device positioned against the faceplate of a multi-jaw chuck;

Fig. 2 is a side elevational view of Fig. 1;

Fig. 3 is a side elevational view of the work holding device of Fig. 1;

Fig. 4 is a top plan view of Fig. 3;

Fig. 5 is an enlarged vertical sectional view taken generally along line 5—5 of Fig. 4;

Fig. 6 is a side elevational view similar to Fig. 3 of a modified form of the invention; and Fig. 7 is a top plan view of Fig. 6.

While the invention is herein described in a number of preferred embodiments, it is not intended to limit the invention to the specific forms and arrangements shown, it being contemplated that various changes may be made by those skilled in the art without departing from the spirit and scope of the appended claims.

Referring now to Figs. 1 and 2, a preferred form of the invention is shown as used with a standard multi-jaw chuck 10 which includes a faceplate 11 and a series of jaws 12 movable on the faceplate 11 in predetermined paths toward and away from an axis 13 of the chuck 10 for clamping operations. The chuck 10 is provided with a shank portion 14 for mounting the chuck 10 in the head stock (not shown) of a machine tool. In Figs. 1 and 2, a work supporting member 15 is positioned against the faceplate 11 of the chuck 10 out of the paths of movement of the jaws 12 as they move to clamp a thin workpiece 16 disposed thereagainst in the chuck 10.

The work supporting member 15, as best shown in Figs. 3, 4 and 5, includes a series of radial arms 17 usually corresponding in number to the number of jaws 12 on the chuck with which it is to be used. The arms 17 are secured together at one end of each at a center or juncture 18 with the arms 17 themselves being angularly spaced apart equidistantly. A flat work supporting surface 19 is formed on the work supporting member 15, particularly adjacent the juncture 18 of the arms 17. With this construction, the work supporting member 15 may be positioned against the faceplate 11 of the chuck 10 with the juncture 18 disposed adjacent the center or axis 13 of the chuck 10 and the arms 17 extending between the jaws 12 of the chuck 10 out of the paths of clamping movement of the jaws 12, as shown in Fig. 1.

As the thin workpiece 16 is positioned against the work supporting surface 19 of the member 15 before being clamped between the jaws 12 of the chuck 10, means are provided for adjusting the work holding member 15 relative to the faceplate 11 of the chuck 10 to insure that the work supporting surface 19 is disposed parallel to the faceplate 11 of the chuck 10 whereupon the workpiece 16 will be disposed normal to the axis 13 of the chuck 10 and the machine tool. To provide such work holding member adjusting means, a stepped bore 21 having an axis normal to the work supporting surface 19 is provided in the end of each of the radial arms 17. Each stepped bore 21 includes a smooth portion 22 adjacent the work supporting surface 19 and a reduced diameter internally threaded portion 23 adapted to be disposed nearest the faceplate 11 of the chuck 10. A bolt 24 is threadably engaged in the reduced portion 23 of each of the bores 21 and has a head portion 25 disposed in the smooth portion 22 of each of the stepped bores 21. When the work supporting member 15 is positioned for use with the chuck 10, the ends of the bolts 24 engage the faceplate 11 of the chuck 10. As each of the bolts 24 is independently adjustable, a machinist may properly adjust the bolts 24 on the work supporting member 15 so that the work supporting surface 19 thereon is disposed parallel to the faceplate 11 of the chuck 10. In order to determine when the work supporting surface 19 is properly aligned, the machinist may use a standard scale for measuring the distance from each arm 17 to the faceplate 11.

With the bolts 24 being freely adjustable, it is also possible that the work supporting member 15 may be disposed varying distances from the faceplate 11 of the chuck 10, as may be desirable for different workpieces.

As best shown in Fig. 5, a compression spring 26 surrounds each bolt 24 and is disposed in the smooth portion 22 of each stepped bore 21 between the head 25 of each bolt 24 and a shoulder 27 extending between the smooth bore 22 and the threaded bore 23. These springs 26 tend to stabilize the adjusted bolts 24 and prevent undesirable movements thereof which would result in misalignment of the work supporting surface 19 relative to the faceplate 11 of the chuck 10.

A modified form of the invention is shown in Figs. 6 and 7 and includes means on a work supporting member 35, which is similar in form to the work supporting member 15, for holding the work supporting member 35 against the faceplate of a chuck and also means on the member 35 facilitating an indication when the work supporting surface 39 thereon is disposed parallel to the faceplate of the chuck. The means provided for holding the work supporting member 35 against the faceplate of the chuck includes small permanent magnets 48, one of which is secured to the end of each of the adjustable bolts 44 on the work supporting member 35. The elements of the work supporting member 35 identical to elements of the work supporting member 15 are identified, for convenience, by the same reference numerals plus 20.

As shown in Figs. 6 and 7, a micrometer receiving bore 49 is provided in each of the radial arms 37 intermediate the ends thereof. With these micrometer receiving bores 49, it is very simple for a machinist to insert a standard depth micrometer in each of the bores 49 against the faceplate of a chuck and adjust the bolts 44 until the supporting surface 39 of the work supporting member 35 is disposed parallel to the faceplate of a chuck. Additionally readings may be taken with a dial indicator from a toolpost to determine the proper alignment of the work supporting surface.

Although the work supporting members shown in the drawings include three arms for use with a standard three-jaw chuck, a four armed work supporting member would obviously be provided for use with a standard four-jaw chuck.

It is believed evident that the foregoing description of this invention has fully set forth the method in which this work supporting member is utilized, including positioning the work supporting member against the faceplate of the chuck with the arms extending between the jaws of the chuck and the juncture of the arms being disposed adjacent the axis of the chuck, whereupon a thin workpiece, such as a washer, may be disposed against the work supporting surface of the work holding member, which has been adjusted until it is parallel to the faceplate of the chuck, before being clamped between the jaws of the chuck in proper alignment for a machining operation.

The work supporting member disclosed herein improves the quality and efficiency of the production of relatively thin workpieces inasmuch as after the work supporting member has once been properly adjusted, every workpiece thereafter will be machined exactly the same as the preceding workpieces.

I claim:

1. A work holding device for supporting relatively thin workpieces to be clamped in a standard chuck having a plurality of jaws movable along predetermined paths to clamp a workpiece, comprising: a work supporting member adapted to be positioned against a faceplate of the chuck out of the paths of movement of the chuck jaws and having a work supporting surface; and means abuttable against the faceplate at at least three points for adjusting said member relative to the faceplate of the chuck to dispose said work supporting surface parallel to the faceplate of the chuck whereupon a relatively thin workpiece held thereagainst is properly aligned to be clamped in the chuck jaws, said means including magnetic members engageable with the faceplate whereby the work supporting member may be shifted laterally of the faceplate.

2. A work holding device for supporting workpieces to be clamped in a standard chuck having a plurality of jaws movable along predetermined paths to clamp a workpiece, comprising: a work supporting member adapted to be positioned against any part of a faceplate of the chuck out of the paths of movement of the chuck jaws; means on said member defining a work supporting surface; adjustable means on said member for positioning said work supporting surface parallel to the faceplate of the chuck whereupon a workpiece held thereagainst is properly aligned to be clamped in the chuck jaws; and magnetic means for holding said work supporting member against the faceplate of the chuck in either concentric or non-concentric relation with the faceplate.

3. A work holding device for supporting workpieces to be clamped in a standard multi-jaw chuck wherein the jaws are movable along predetermined paths to clamp a workpiece, comprising: a work supporting member including a series of radial work supporting arms secured together at a center, said member being adapted to be positioned against a faceplate of the chuck with the arms out of the paths of movement of the chuck jaws; means for adjusting said member relative to the faceplate of the chuck to dispose said work supporting surface parallel to the faceplate of the chuck whereupon a workpiece held thereagainst is properly aligned to be clamped for a machining operation by the chuck jaws; and permanent magnet means for holding said work supporting member on the faceplate.

4. A work holding device for supporting relatively thin workpieces to be clamped in a standard three-jaw chuck, comprising: a work supporting member including three radial arms secured together at one end of each as a center and angularly spaced apart equidistantly and having a work supporting surface at the juncture of said arms, said member being adapted to be positioned against a faceplate of the chuck with each arm extending between a pair of the chuck jaws; and adjustable means at the end of each of said arms for disposing said work supporting surface parallel to the faceplate of the chuck whereupon a relatively thin workpiece held thereagainst is properly aligned to be clamped in the chuck jaws for a machining operation, said adjustable means including a magnet associated with each arm and engageable with the chuck faceplate whereby the member may be held in a non-concentric position relative to the faceplate.

5. A work supporting device for supporting workpieces to be clamped in a standard multi-jaw chuck, comprising: a work supporting member including a series of radial arms equal in number to the jaws of the chuck secured together at one end of each as a center and angularly spaced apart equidistantly; a bolt carried at the outer end of each of said arms with its axis extending normal to the work supporting surface of said member; said member being adapted to be positioned with the ends of said bolts abutting a faceplate of the chuck with each arm extending between a pair of the chuck jaws, said bolts being adjustable relative to the arms to dispose said work supporting surface parallel to the faceplate of the chuck at a desired distance therefrom whereupon a workpiece held thereagainst is properly supported to be clamped in the chuck jaws for a machining operation; and magnet means at the end of each of said adjustable bolts for abuttably securing said work supporting member to the faceplate of the chuck in any desired position radially thereof.

6. A work holding device for supporting relatively thin workpieces to be clamped in a standard three-jaw chuck, comprising: three radial arms secured together at one end of each as a center and forming a work supporting surface; an adjustable bolt carried at the outer end of each of said arms, said bolts having their axis extending normal to the work supporting surface of said member; said member being adapted to be positioned against a faceplate of the chuck with each arm extending between a pair of the chuck jaws and with said bolts being adjusted to dispose said work supporting surface parallel to the faceplate of the chuck at a desired distance therefrom whereupon a relatively thin workpiece held thereagainst is properly aligned to be clamped in the chuck jaws; and a permanent magnet mounted at the end of each of said adjustable bolts for holding said work supporting member against the faceplate of the chuck.

7. A work holding device for supporting relatively thin workpieces to be clamped in a standard multi-jaw chuck, comprising: a work supporting member including radial arms corresponding in number to the jaws of the chuck and secured together at one end of each as a center and angularly spaced apart equidistantly; means on said member defining a work supporting surface at said center; means in the outer end of each of said arms defining a stepped bore having an axis extending normal to said work supporting surface, the reduced portions of said bores being spaced furthest from said work supporting surface and being internally threaded; a bolt threadably engageable in said reduced portion of each bore with its head disposed in the enlarged portion thereof; and a compression spring surrounding each bolt and confined in the enlarged portion of each bore by the head of the bolt disposed therein to prevent undesired movement of said bolts; a permanent magnet on the exposed end of each bolt; said member being adapted to be positioned with the magnets abutting a faceplate of the chuck to hold the member in a desired radial position with each arm extending between a pair of the chuck jaws and with said bolts properly adjusted to dispose said work supporting surface parallel to the faceplate of the chuck whereupon a relatively thin workpiece held thereagainst is properly aligned to be clamped in the chuck jaws.

8. A work holding device of the type described in claim 7 having means on each of said arms intermediate the ends thereof for receiving a micrometer and permitting a determination when said work supporting surface is disposed parallel to the faceplate of the chuck.

References Cited in the file of this patent

UNITED STATES PATENTS

| 2,524,006 | Capellazzi | Sept. 26, 1950 |

FOREIGN PATENTS

| 24,251 | Denmark | Mar. 10, 1919 |
| 117,624 | Sweden | Nov. 12, 1946 |